United States Patent [19]

Breit

[11] 3,902,404

[45] Sept. 2, 1975

[54] SEALING SLEEVE ARRANGEMENT

[75] Inventor: Firtz Erich Breit, Heiligenhaus, Germany

[73] Assignee: Pumpenfabrik Urach, Urach, Germany

[22] Filed: Jan. 26, 1973

[21] Appl. No.: 327,219

[30] Foreign Application Priority Data

Jan. 29, 1972  Germany............................ 2204162
Dec. 16, 1972  Germany............................ 2261638

[52] U.S. Cl. .......................... 92/86; 92/153; 92/165; 277/27; 417/568
[51] Int. Cl. ....................... F01b 31/10; F01b 31/20
[58] Field of Search ........ 92/162 R, 162 P, 86, 165, 92/168, 153; 277/27, 53; 417/437, 568

[56] References Cited
UNITED STATES PATENTS 3,438,638   4/1969   Newcomb et al. ...................... 277/27
3,443,814   5/1969   Dahlheimer ........................ 277/27

FOREIGN PATENTS OR APPLICATIONS 1,093,530   12/1967   United Kingdom................... 277/27

Primary Examiner—Paul E. Maslousky
Attorney, Agent, or Firm—Michael S. Striker

[57] ABSTRACT

A reciprocating pump piston is surrounded by a deformable sleeve which forms a gap communicating at one end with a high pressure chamber and being open at the other end so that pressure acting in the gap on one side of the sleeve decreases from one end to the other end. The high pressure chamber also communicates with a sealed control chamber on the other side of the sleeve so that at the other end of the gap, the high pressure in the control chamber deforms the sleeve to reduce the width of the gap so that a desired leakage flow is maintained at a rising pressure.

24 Claims, 8 Drawing Figures

SEALING SLEEVE ARRANGEMENT

BACKGROUND OF THE INVENTION

The present invention is concerned with a sealing arrangement for reciprocating pistons and piston rods and the like, particularly for pumps operating at very high fluid pressure, and transporting non-lubricating low viscosity liquids. It is known to mount on the piston a sealing sleeve which forms an axial annular sealing gap or clearance with the piston. The required sealing effect is difficult to achieve at very high pressure, since the leakage losses rise depending on the height of the pressure. On the other hand, within the annular axial gap, a pressure drop takes place which is substantially proportional to the increased axial distance from the high pressure region, so that the sealing sleeve is subjected to greater pressure by radial forces developed in the gap in the region of the high pressure, than in the region of low pressure at the other end of the gap. This varying load, which proportionally drops in axial direction, and acts in radial direction, has the effect that in the apparatus of the prior art, the sealing sleeve is widened radially in the region of the high pressure end, corresponding with its elasticity, and thereby causes, assuming a minimum gap width at the low pressure end, increased leakage losses which rise depending on the pressure of the fluid pumped by the piston.

This effect of the sealing sleeve is more pronounced, the lower the viscosity of the pumped liquid is, particularly when water or other non-lubricating liquids are pumped. Consequently, when the sealing gap is sufficient, great leakage losses take place, and when the sealing gap is reduced, the surfaces which slide on each other are damaged since the piston and the sleeves do not maintain a centered position.

SUMMARY OF THE INVENTION

It is one object of the invention to overcome the disadvantages of known sealing sleeve arrangements, and to provide an apparatus which reliably and satisfactorily operates with non-lubricating liquids of low viscosity, as well as at high operating fluid pressures and great speed of relatively sliding parts.

In accordance with the invention, the axial sealing gap extends from the high pressure side continuously to an outlet into a low pressure region at the end remote from the high pressure region. The rear face of the sealing sleeve which is radially remote from the axial sealing gap is bounded in accordance with the invention by a control chamber filled with high pressure fluid and communicating with the high pressure region. The control chamber extends substantially over the length of the axial gap, and is closed and sealed from the outlet of the gap. The piston is preferably mounted for universal movement so that it can center itself automatically.

The axial gap and the sealing sleeve are dimensioned so that at full pressure on the high pressure side, the gap is reduced in the region of the low pressure to form a funnel reduced to a gap width at which still no contact between the sleeve and the piston takes place.

When, for example, the gap is formed between the sleeve and the piston, the pressure in the gap at the outlet end will be less than the pressure acting in the control chamber outside of the sleeve, and consequently the diameter of the sleeve is reduced in the region of the outlet end of the gap where low pressure prevails. The sealing by means of the reduced gap is the more effective the higher the pressure at the high pressure end of the gap is, so that even at very high pressures, a desired small leakage flow takes place. Due to the universal movability of the piston, a centering effect is obtained so that between the high pressure end and the low pressure end a conically reduced gap is obtained, and the respective sealed part, for example the piston, floats in the liquid filling the gap.

Practical tests have proved that even non-lubricating low-viscosity liquids can be sealed even at very high pressures, and that the leakage losses can be reduced to a minimum required for preventing damages of the relatively moving faces. In fact, the sealing arrangement works the better, the higher the relative speed of the seal parts is.

In order to obtain the most favorable deformation of the sealing sleeve, it is preferred to provide sleeves having different radial wall thicknesses along the length of the axial gap. By suitably shaping the sleeve, the sealing effect can be improved and adapted to different pressures. It has been found particularly advantageous to make the wall thickness of the center portion of the sleeve greater than at the ends of the sleeve, if high pressures of over 1000 atms. are used. On the hand, machines operating at pressures below 500 atms., require a constricted central part, while machines operating at intermediate pressures between 500–1000 atms. operate best with a sealing sleeve whose wall thickness is constant or substantially constant along the length thereof.

The smallest radial width of the sealing gap should not be under 0.005mm., but can be greater, depending on the permissible amount of leakage flow. The width of the axial gap without pressure acting on the sleeve, can be a multiple of the above-mentioned smallest radial width, and has to be correlated with the radial dimensions of the sealing sleeve so that at full working pressure the smallest width of the gap at the low pressure end, together with the centering effect of the fluid flowing the gap, will not cause contact between the relatively moving parts.

In order to make possible a self-centering of the piston or the like sealed by the sealing sleeve, in accordance with the invention, one end of the piston is coupled with with the drive means, for example a reciprocating cross head, for universal movement. Preferably the coupling is effected by a convex or spherical face cooperating with a wall of the drive means. In addition to radial play, a small axial play may be used in the coupling. The wall of the drive means may be mounted on ball bearings.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
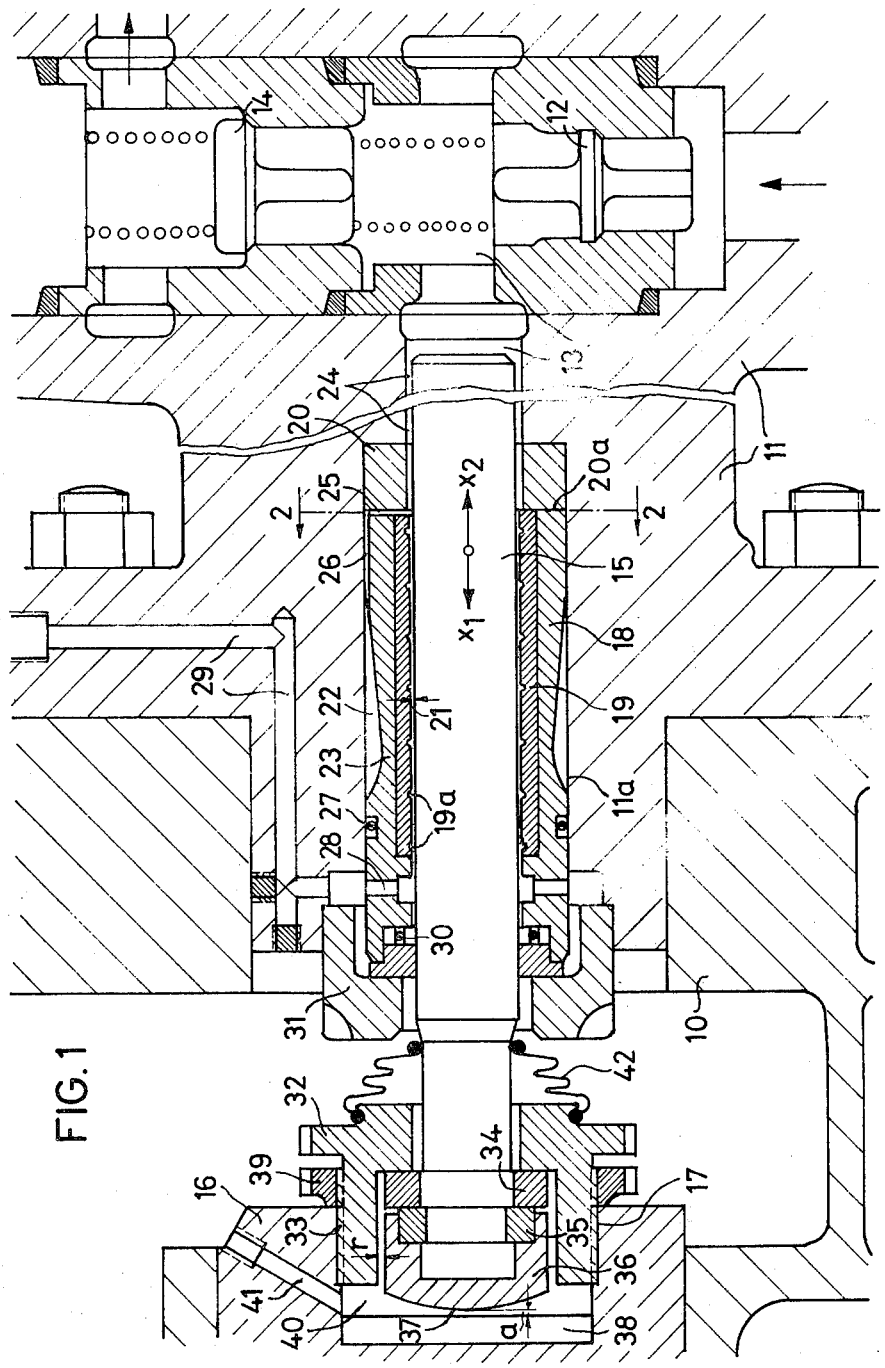
FIG. 1 is a fragmentary axial sectional view illustrating a piston pump provided with a sealing sleeve arrangement according to one embodiment of the invention.

FIG. 1 illustrates a piston pump with a housing 10 and a cylinder housing block 11. A suction valve 12 permits liquid to enter the pressure chamber 13 and to be discharged through the check valve 14. A piston 15 is coupled by coupling means 17 with drive means, shown to be a cross head 16 which is reciprocated by a crank shaft, now shown.

Figure 2:
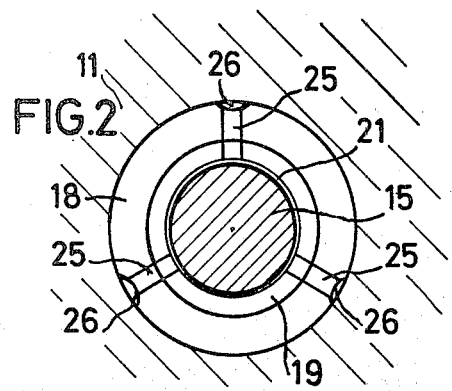
FIG. 2 is a cross sectional view taken on line 2—2 in FIG. 1.

A sealing sleeve 18, preferably made from metal and inserted into a bore 11a of the housing 11, is used for sealing the piston 15. A slide bushing 19 consisting of hardened stainless steel is fixedly inserted into the sleeve 18, and may be adhesively connected therewith. The sealing sleeve 18 and the bearing bushing 19 consists of one integral piece. An annular abutment 20 mounted on the housing 11 has an annular abutment face against which the annular end face of the sleeve 18 abuts. Between the sealing sleeve 18, 19 and the piston 15, a narrow annular axial extending gap 21 is provided whose width is uniform along the length of the sleeve, and is preferably at least 1/100mm. The width of the gap is shown exaggerated in the drawing. The outer cylindrical surface of sealing sleeve 18 is reduced to for a constricted portion so that the wall thickness of sleeve 18, 19 is less in the region of the control space 22 than at the high pressure end toward which the thickness of sleeve 18 increases. The control chamber 22 between the outer surface of the sleeve 18 and the inner surface of bore 11a in the housing 11, is connected by axial grooves 26 and radial grooves 25 in the end face of sleeve 18, with a high pressure chamber 13, 24. Grooves 25 and 26 are best shown in FIG. 2.

At the end of control chamber 22 remote from the high pressure chamber 13, a sealing ring 27 is provided between the housing 11 and the sleeve 18 for closing and sealing the control chamber 22. Behind sealing ring 27, outlet bores 28 in the sleeve 18, and 29 in the housing are provided and serve for discharging leakage flow passing through the gap 21 from the high pressure chamber 13 through gap 21 to the other end of the gap. Another sealing ring 30, which acts as a stripper seal prevents the uncontrolled discharge of leakage flow into the other parts of the housing so that the leakage flow flows through the outlet bores 28, 29. A cap nut 31 holds the sealing sleeve with its bushing 19 in the bore 11a of the housing block 11.

Particularly in order to assure a contact free movement of piston 15 also in the low pressure region and during starting of the pump, the inner bore of the bushing 19 is provided with peripheral grooves 19a in which the liquid pumped by the pump can accumulate.

The coupling 17 which connects piston 15 with the reciprocating cross head 16 of the drive means, includes a threaded tubular coupling portion 32 with a sealing thread 33 engaging a corresponding thread in cross head 16. The threaded tubular coupling portion 32 holds through rings 34 and 35, the axial end piece 36 which serves for axially supporting piston 15. The piece 36 has a convex or part-spherical face 37 which may be spaced a small axial distance a for example 0.1mm. from the wall 38 of the cross head 16. Radial play r is provided between the piece 36 and the tubular member 32. A counter nut 39 locks the threaded tubular member 32 in the adjusted position. The inner space 40, which permits member 36 and piston 15 in addition to radial and axial play, also limited universal play, is filled with high viscosity damping fluid such as oil which can be filled into the space 40 through a closable bore 41. A bellows sealing means 42 seals the interior of the threaded coupling portion 32 of coupling 17.

The above-described sealing arrangement operates as follows:

During the suction stroke of piston 15 in the direction of the arrow $x_1$ to a retracted postion in which the end face of piston 15 is substantially located in the region of the cooperating end faces of members 18 and 20, the liquid is sucked through the check valve 12 into the pressure chamber 13, and is discharged during the forward stroke in the direction of the arrow $x_2$ through the check valve 14. The fluid under pressure, particularly during the pressure stroke of the piston 15, enters the high pressure end of the gap 21 and gradually fills the same, including the grooves 19a. At the same time, the liquid at high pressure flows through the radial grooves 25 and the axial grooves 26 into the control chamber 22 formed in the housing 11 by the outer surface of the sealing sleeve 18, so that the sealing sleeve 18 is subjected to radial forces acting within and without the sealing sleeve 18.

Figure 3:
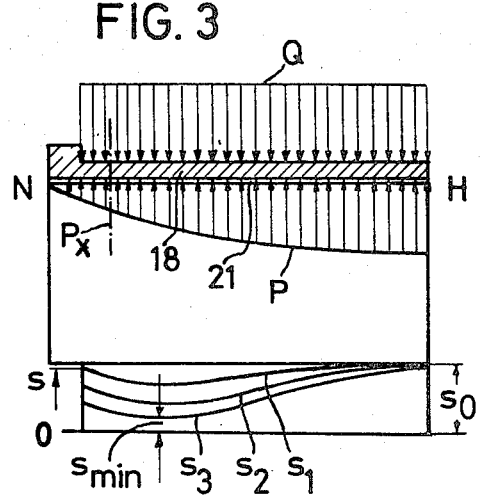
FIG. 3 is a diagram illustrating in its upper portion, the forces causing a deformation of the sleeve, and in its lower portion the deformation of the sleeve by which the gap is reduced.

FIG. 3 illustrates in its upper part the distribution of forces produced by the high pressure fluid entering into the gap 21 and into the control chamber 22. The pressure fluid in the gap 21 produces pressure forces P in outward direction, and the pressure fluid in the control chamber 22 produces pressure forces Q which are inwardly directed. The control chamber 22 is schematically shown, and it will be seen that the pressure forces Q are equal along the length of the sleeve 18 due to the fact that the control chamber 22 is closed and sealed.

The pressure forces P gradually drop from the high pressure side H to the low pressure side N due to the discharge of pressure fluid through the outlet 28. Since the forces Q and P oppose each other, the resultant force acts on the sleeve 18. In the high pressure region H at the right end of sleeve 18, the forces Q and P balance each other, but at the low pressure end N at the left of FIG. 3, the forces P are smaller than the forces Q and the resultant force acts on sleeve 18 to reduce the diameter thereof by deformation of the respective end portion of sleeve 18.

The lower portion of FIG. 3 shows the different deformations $s1$, $s2$, $s3$ which cause a reduction of the width of gap 21 to $s_{min}$ from the initial width $s_0$. In this manner an annular constriction is formed in the gap 21 whose free flow cross section depends on the pressure in the high pressure region H. The minimum gap width $s_{min}$ is the smaller the greater the pressure acting on the sleeve 18 is. When during the operation of the machine, the pressure in the pressure chamber 13 varies, the deformation of the sealing sleeve 18 varies correspondingly, and the effective flow cross section of the gap corresponds always to the pressure so that the flow cross section remains substantially constant whereby even at great pressure fluctuations and high pressures, leakage flow is automatically maintained at the desired small volume at which no contact between the sleeve 18 and the piston 15 takes place.

Due to the fact that the sealing gap 21 is gradually reduced from the high pressure end to the low pressure end, a hydraulic centering of piston 15 takes place. The peripheral grooves 19a in the bushing 19 further improves the centering, particularly when the machine operates at low pressure, for example during the start of the pump.

The above-described advantageous result of the arrangement of the invention cannot be obtained by the apparatus of the prior art in which there is no pressure fluid supplied to a control chamber outside of the sleeve 18. Due to the load by the pressure forces P, as shown in FIG. 3, the pressure in gap 21 drops in the apparatus of the prior art between the high pressure end and the low pressure end, as in the present invention. However, the forces Q are absent from the prior art, and a automatic reduction of the free flow cross section of the gap cannot be obtained. Due to the reduction of the pressure on one side of the sleeve of the prior art, a frictional engagement of the parts, particularly when a nonlubricating low-viscosity liquid is pumped, could not be avoided. When the pressure is increased in the prior art, the gap becomes wider at the high pressure end where the outward forces in the gap are greatest, so that the width of the gap is increased at the high pressure end, the greater the pressure in the pressure chamber is, resulting in excessive leakage flow.

Figure 4:
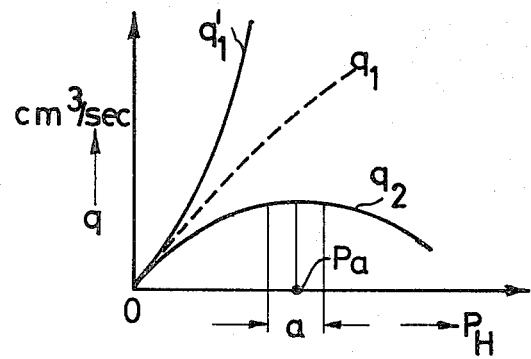
FIG. 4 is a diagram illustrating leakage flow losses in the prior art and in the present invention.

In the diagram shown in FIG. 4, the leakage flow $q$ is graphically shown dependent on the sealing pressure $B_H$ at the high pressure side. The graph $q_1$ illustrates the leakage flow in apparatus according to the prior art, and the graph $q_2$ illustrates the leakage flow in apparatus according to the invention. As shown in FIG. 4, the leakage flow $q_1$ rises proportional to the pressure $P_H$ at lower pressures, while the graph $q_1$ illustrates the unacceptable leakage flow in the prior art construction at high pressure.

In apparatus of the invention, the leakage flow is represented by the graph $q_2$, and it is apparent that the leakage flow is reduced when a certain pressure $P_a$ is reached, and then remains substantially constant in the region $a$ due to the automatic deformation of the sleeve obtained by pressure variations. It is apparent that the arrangement of the invention is particularly suitable for sealing operation of the pump at very high pressure, which are in the region $a$ shown in FIG. 4, or above the same.

The liquid flowing through the gap 21 can be returned through the outlet bores 28, 29 into the suction system of the pump, but it is also possible to provide an outlet for the leakage flow corresponding to the outlet 28 in the region at which the gradually reduced forces P in the gap has not yet arrived at atmospheric pressure, for example in the region $P_r$ shown in FIG. 3.

Due to the axial play $a$ and the radial play $r$ of the coupling means 17 shown in FIG. 1, and also by the part-spherical abutment face 37 of member 36, it is assured that piston 15 can assume a position in which the piston 15 is centered in the sleeve 18.

The damping liquid, for example oil, in the space 40 prevents an impact of parts 36, 38 so that noisy blows are avoided. Instead of a damping fluid, a damping material, such as rubber, can be used to receive the impact forces during the reciprocation of the pump piston 15.

Figure 5:
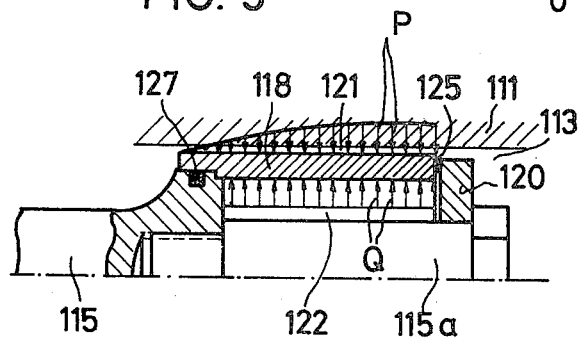
FIG. 5 is a fragmentary axial sectional view of another embodiment of the invention combined with a diagram showing the distribution of forces acting on the sealing sleeve.

FIG. 5 illustrates another embodiment of the invention in which the pump piston 115 has a threadedly secured insert 115a and a sleeve 118 which forms a gap 121 with the cylinder bore of housing part 111. A sealing ring 127 seals the control chamber 122 within the sealing sleeve 118. An abutment ring 120 is secured to the piston portion 115a and limits axial movement of sleeve 118. In this embodiment, the annular axially extending sealing gap 121 is radially outward of the control chamber 122, and one end of gap 121 and of control chamber 122 communicates with the high pressure chamber 113 of the pump. As explained with reference to FIG. 3, the pressure forces P act inward in the gap 121 and the pressure forces Q act outward in the control chamber 122 so that the sealing sleeve 118 is widened at its low pressure end, and the sealing gap 121 is reduced to the minimum gap width or flow cross section $s_{min}$. Otherwise, the operation of the embodiment of FIG. 5 is the same as described with reference to the embodiment of FIG. 1, and the modifications described with reference to FIG. 1 can be used, for example, the wall thickness of sleeve 118 can be varied along the length thereof, grooves may be provided in the surface of the sleeve bounding the gap 121, and the piston means 115 may be supported by coupling means as described with reference to FIG. 1 for universal self-centering movement.

In the embodiment of FIG. 1, the inner surface of the sealing sleeve 18 forms with the piston means 15 the annular gap 21, and the outer surface of the sleeve forms with the housing means the closed control chamber 22.

In the embodiment of FIG. 5, the outer surface of the sealing sleeve 118 forms with the housing means 111 the gap 121, and the inner surface of the sealing sleeve 118 forms with the piston means 115 the closed control chamber 122.

Generally speaking, one of the surfaces of the sealing sleeve 118 forms either with the housing means or with the piston means the gap 21, and the other surface forms either with the piston means or with the housing means a closed control chamber 22.

Figure 6:
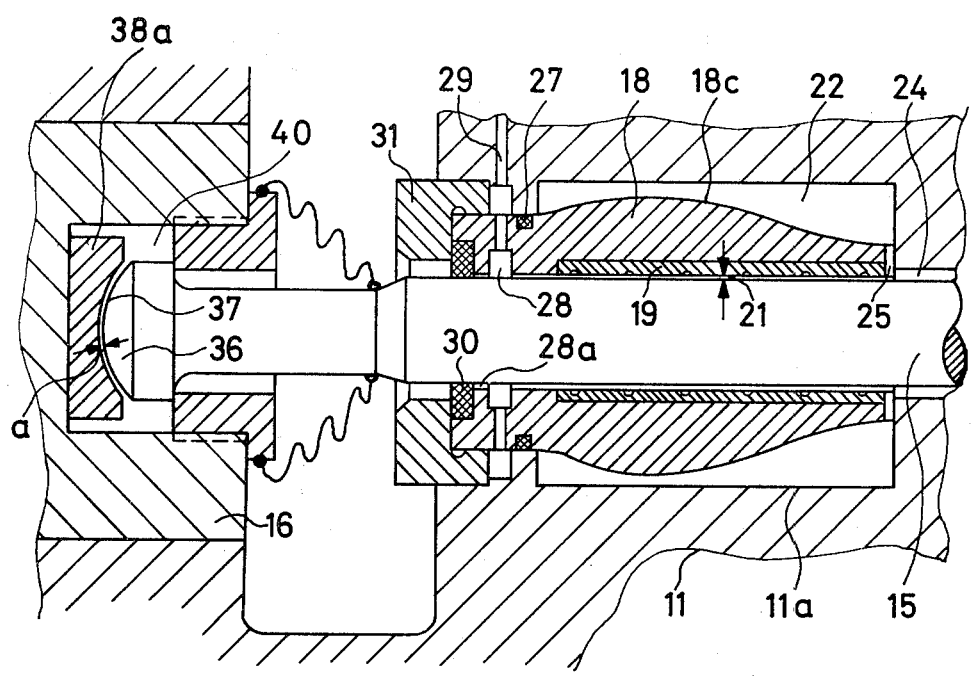
FIG. 6 is a fragmentary axial view illustrating a modification of the apparatus suitable for high pressure.
Figure 7:
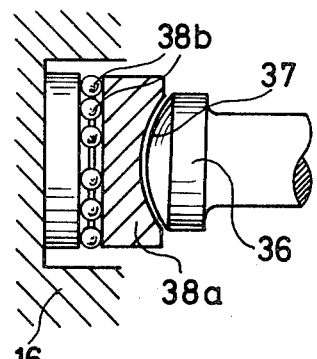
FIG. 7 illustrates a modification of a detail of the apparatus of FIG. 6.

The modification of FIG. 6 corresponds to the construction shown in FIG. 1, and corresponding parts are indicated by corresponding primed reference numerals. The cylinder block 11' has a bore 24' in which the piston means 15' is located. In a cylindrical recess 11a of the cylinder block 11', the sealing sleeve 18' with a bushing 19' is inserted in such a manner that the piston means 15' passes through sleeve 18', 19' in axial direction, while radially outward of sleeve 18' a control chamber 22' is formed in the recess 11a. The sealing gap 21' has, when there is no load on the machine, the same radial width along its length, which is preferably between 100mm. and several hundredth millimeters. The sealing sleeve 18' is fixedly inserted into the cylinder housing block 11', a sealing means 27 being provided for sealing the control chamber 22' at the end remote from the high pressure chamber. A screw cap 31' secures the sleeve 18' in axial direction.

In the same manner as described with reference to FIG. 1, the sealing gap 21' communicates through the bore 24' with the pump chamber, and by means of grooves 25' with the control chamber 22'. On the low pressure end, the sealing gap 21' is connected with outlet means 28', 29', which may freely open into the atmosphere, or connect with an air reservoir.

The sealing means 30' performs a stripping function and abuts without or with a low pressure, against the piston means 15'. The sealing means 30' may also be omitted if discharge of leakage fluid through the axial bore 28a is of no importance, and the leakage flow can be discharged instead of through the outlet 28, through the axial bore 28a.

The piston means 15' has an abutment member 36' with a spherical abutment face 37' which abuts, preferably with some axial play $a$, on a correspondingly shaped spherical seat 28a which is mounted on the drive member 16', for example, a cross head, for radial movement in all directions. Preferably the space 40' in which the abutment member 36' abuts the seat 38a, is filled with oil so that the parts can move with little friction relative to each other.

In order to further reduce the friction, the seat disc 38a can be mounted by means of balls or rollers 38b on a face of the cross head 16'.

As described above, FIG. 1 provides a sealing sleeve 18 which has a constricted portion near the low pressure end, so that the cross section of sealing sleeve 18 is gradually reduced from the high pressure chamber 13 down to the low pressure outlet 38. This causes, due to the high pressure in the control chamber 22, the deformation of the sealing sleeve 18 and the narrowing of the axial sealing gap 21, as explained with reference to FIG. 3.

It has been found that for obtaining the most favorable shape of the gap 21, the sleeve 18 must be formed in accordance with the prevailing pressure conditions. The constricted sealing sleeve 18 shown in FIG. 1 is suitable for comparatively low pressures, up to about 500 atms. When the pressure is higher, the depth of the constriction may be reduced, and when the pressure becomes very high, the sealing sleeve 18' may have a central portion, preferably closer to the low pressure end, which is thicker than the end of the sleeve in the region of the high pressure chamber 13.

Figure 8:
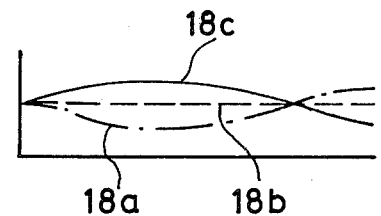
FIG. 8 is a diagram illustrating sealing sleeves modified in accordance with the prevailing high or low pressure.

FIG. 8 shows schematically the profile outline of several modified sleeves. At low pressures, up to 500 atms., the sealing sleeve 18 has preferably a constriction 18a. At average pressure, between 500 and 1000 atms., the profile 18b is suitable, and the sleeve may be of uniform thickness or cross section, or approach such a shape.

For machines operating at very high pressure above 1000 atms. up to 1500 atms., the sealing sleeve 18 is formed with a thickened portion as shown in FIG. 6 and at 18c in FIG. 8. Due to the thicker part of the sleeve, the high pressure in the control chamber 22' near the low pressure end cannot compress the sleeve 18 too much so that no metallic contact between the relatively movable surfaces of sleeve 18 and of piston means 15 can occur.

It is evident that the given ranges for shaping the profile of the sealing sleeve depending on the pressure on the high pressure end, may be varied, and depend on the dimentions of the sealing sleeve 18, including the dimensions of a bushing 19, on the elasticity and resilience of the material of the sleeve, and on the initial width of the gap 21.

It will be understood that each of the elements described above, or two or more together, may also find a useful application in other types of sealing sleeve arrangements for pistons differing from the type described above.

While the invention has been illustrated and described as embodied in a sealing sleeve arrangement in which the sealing sleeve is deformed and constricted by pressure in a control chamber surrounding the sealing sleeve, it is not intended to be limited to the details shown, since various modifications and structural changes may be made without departing in any from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. Sealing sleeve arrangement, comprising housing means having a pressure chamber and an outlet; piston means mounted for free reciprocation and limited transverse self-centering movement in said housing means for producing high pressure in said pressure chamber; and elongated deformable sealing sleeve means in said housing means concentric to said piston means and extending from said pressure chamber to said outlet, said sleeve means having inner and outer surfaces which each extend over the axial length of said sleeve means, one of said surfaces forming with one of said piston and housing means an annular axial gap extending over substantially the entire distance from said pressure chamber to said outlet and communicating at its one end with said pressure chamber and at its other end with said outlet so that the pressure in said gap decreases continuously from said one end to said other end, and the other surface forming with the other one of said piston and housing means a closed control chamber communicating with said pressure chamber so that equal high pressure in said control chamber opposes the pressure acting in said gap on said sleeve, at least the interior portion of said sleeve means being positively connected for movement in radial direction substantially throughout said axial length of said sleeve means so as to deform together under the influence of said pressures, whereby said sleeve means is non-uniformly deformed over the length of said gap and the diameter of said sleeve means is changed at said other end of said gap where low pressure prevails, so that the width of said gap is reduced depending on the pressure and a desired leakage flow is thereby maintained.

2. Arrangement as claimed in claim 1, comprising drive means for reciprocating said piston means and including a support supporting said piston means for universal movement.

3. Arrangement as claimed in claim 1, wherein said one surface is the outer surface of said sleeve means; and said other surface is the inner surface of said sleeve; and wherein said one means is said housing means and said other means is said piston means so that said gap is formed between said housing means and said sleeve means, and said control chamber is formed between said piston means and said sleeve means.

4. Arrangement as claimed in claim 1, wherein said one surface is said inner surface of said sleeve means and said other surface is the outer surface of said sleeve means; and wherein said one means is said piston means and said other means is said housing means so that said gap is formed between said piston means and said sleeve means, and said control chamber is formed between said housing means and said sleeve means.

5. Arrangement as claimed in claim 1, wherein said gap is open at said other end.

6. Arrangement as claimed in claim 1, comprising sealing means for sealing said other end of said gap downstream of said outlet so that the entire leakage flow flows into said outlet.

7. Arrangement as claimed in claim 1, wherein said gap and said sleeve means have dimensions selected so that at a predetermined maximum pressure the diameter of said sleeve means at said other end of said gap is reduced to a width of approximately 0.005mm.

8. Arrangement as claimed in claim 1, comprising means for sealingly fixing said sleeve means in the region of said other end to one of said piston and housing means.

9. Arrangement as claimed in claim 1, comprising sealing means for sealing said control chamber in the region of said other end of said gap.

10. Arrangement as claimed in claim 1, wherein said one surface which bounds said gap has relief grooves.

11. Arrangement as claimed in claim 1, wherein said sleeve means is fixedly mounted in a cylindrical bore of said other means with said other surface located in said bore; and wherein said one surface is an annular recess bounding said gap.

12. Arrangement as claimed in claim 1, wherein said sealing sleeve means has a wall thickness varying between the axial ends thereof in accordance with the deformation of said sleeve means desired at different pressures.

13. Arrangement as claimed in claim 12, wherein the wall thickness of the central portion of said sleeve means is greater than the wall thickness of the end portions of said sleeve means so that said sleeve means is deformed to the desired reduced diameter when the pressure in said pressure chamber and control chamber is about 1000 atms.

14. Arrangement as claimed in claim 12, wherein the wall thickness of the central portion of said sleeve means is smaller than the wall thicknesses at the ends of said sleeve means so that said sleeve means is deformed to the desired reduced diameter when the pressure in said pressure chamber and control chamber is about 500 atms.

15. Arrangement as claimed in claim 12, wherein said sleeve means has a substantially uniform wall thickness along the length thereof so that said sleeve means is deformed to the desired reduced diameter when the pressure in said pressure chamber and control chamber is between 500 atms. and 1000 atms.

16. Arrangement as claimed in claim 12, wherein a wall portion of said sleeve means located in the low pressure region of said other end of said gap has the greatest variation of wall thickness.

17. Arrangement as claimed in claim 1, comprising drive means reciprocating in axial direction of said piston means; and coupling means supporting said piston means for universal movement on said drive means so that said piston means is centered in said gap.

18. Arrangement as claimed in claim 17, wherein said coupling means includes a convex coupling portion at one end of said piston means, and a part of said drive means cooperating with said convex coupling portion.

19. Arrangement as claimed in claim 18, wherein said convex coupling portion is spaced in axial direction a small distance from said part.

20. Arrangement as claimed in claim 18, wherein said part has a part-spherical concave seat, and wherein said convex coupling portion has a part-spherical surface abutting said concave seat of said part of said drive means.

21. Arrangement as claimed in claim 18, wherein said drive means includes movable low friction means supporting said part with said seat for movement.

22. Arrangement as claimed in claim 1, comprising sealing means for sealing said other end of said gap down-stream of said outlet substantially without pressure only so that the leakage flow flows into said outlet.

23. Sealing sleeve arrangement comprising housing means having a pressure chamber and an outlet; piston means mounted for free reciprocation and limited transverse self-centering movement in said housing means for producing high pressure in said pressure chamber; an annular abutment having an annular face; and a deformable sealing sleeve in said housing means concentric to said piston means and having inner and outer surfaces, one of said surfaces forming with one of said means an annular axial gap communicating at one end thereof with said pressure chamber and at the other end thereof with said outlet so that the pressure in said gap decreases from said one end to said other end, and the other surface forming with the other one of said means a closed control chamber along the length of said sleeve communicating with said pressure chamber so that equal high pressure in said control chamber opposes the pressure acting in said gap on said sleeve whereby said sleeve is deformed and the diameter thereof is reduced at said other end of said gap where low pressure prevails, so that the width of said gap is reduced depending on the pressure and a desired leakage flow is maintained, said sleeve having an annular face abutting said annular face in the high pressure region at said one end of said gap, at least one of said annular faces being formed with grooves connecting said pressure chamber with said control chamber.

24. Sealing sleeve arrangement comprising housing means having a pressure chamber and an outlet; piston means mountef for free reciprocation and limited transverse self-centering movement in said housing means for producing high pressure in said pressure chamber; and a deformable sealing sleeve in said housing means concentric to said piston means and having inner and outer surfaces, one of said surfaces forming with one of said means an annular axial gap communicating at one end thereof with said pressure chamber and at the other end thereof with said outlet so that the pressure in said gap decreases from said one end to said other end, and the other surface forming with the other one of said means a closed control chamber along the length of said sleeve communicating with said pressure chamber so that equal high pressure in said control chamber opposes the pressure acting in said gap on said sleeve whereby said sleeve is deformed and the diameter thereof is reduced at said other end of said gap where low pressure prevails, so that the width of said gap is reduced depending on the pressure and a desired leakage flow is maintained; drive means reciprocating in axial direction of said piston means; and coupling means supporting said piston means for universal movement on said drive means so that said piston means is centered in said gap, said coupling means including a convex coupling portion at one end of said piston means, and a part of said drive means cooperating with said convex coupling portion, said coupling portion being spaced in axial direction from said part by a small distance, and a viscous dampening medium between said convex coupling portion and said part.

* * * * *